United States Patent
Ettinger et al.

(10) Patent No.: US 8,538,442 B1
(45) Date of Patent: Sep. 17, 2013

(54) INDOOR LOCALIZATION OF MOBILE DEVICE USING LABELS

(75) Inventors: Scott Ettinger, San Carlos, CA (US); Mohammed Waleed Kadous, Sunnyvale, CA (US); Andrew Lookingbill, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 70 days.

(21) Appl. No.: 13/160,716

(22) Filed: Jun. 15, 2011

(51) Int. Cl.
*H04W 40/00* (2009.01)

(52) U.S. Cl.
USPC ............. 455/446; 455/456.1; 455/456.2; 455/456.3; 455/456.4; 455/456.5; 455/456.6

(58) Field of Classification Search
USPC ................................. 455/446, 456.1–456.6
See application file for complete search history.

(56) References Cited

U.S. PATENT DOCUMENTS

| | | | |
|---|---|---|---|
| 6,292,226 B1 * | 9/2001 | Yamanaka et al. | 348/556 |
| 2004/0170154 A1 * | 9/2004 | Carter et al. | 370/338 |
| 2006/0141932 A1 * | 6/2006 | Lawrence et al. | 455/41.2 |
| 2006/0290519 A1 * | 12/2006 | Boate et al. | 340/573.4 |
| 2007/0043811 A1 * | 2/2007 | Kim et al. | 709/203 |

* cited by examiner

*Primary Examiner* — Charles Appiah
*Assistant Examiner* — Edward Zhang
(74) *Attorney, Agent, or Firm* — Lerner, David, Littenberg, Krumholz & Mentlik, LLP

(57) ABSTRACT

To localize a mobile device in an indoor area, labels are positioned at locations throughout the indoor area and signal strength is recorded at the label positions from different wireless network access points that are available in the indoor area. As a user traverses the indoor area with the mobile device, individual label identifiers are entered into the mobile device and the strength of the wireless network signals is recorded at each label position. The sampled wireless network signal strength and the corresponding label identifiers and positions are recorded to generate a mapping that identifies wireless network signal strength at each of the different label positions in the indoor area. The mapping may then be accessed to identify the locations of other mobile device users that subsequently enter the indoor area based on the wireless network signal strength from the different access points detected by the other mobile devices.

22 Claims, 4 Drawing Sheets

INDOOR LOCALIZATION OF MOBILE DEVICE USING LABELS

BACKGROUND

Localization refers to the determination of a location of an object in three-dimensional space. Global Positioning System (GPS) technology is commonly used for localization in an outdoor environment. However, GPS is not as useful for indoor localization because signals from GPS satellites are generally not powerful enough to penetrate most buildings or other structures that create indoor environments.

SUMMARY

Aspects of the present disclosure relate generally to indoor localization of a mobile device. Labels are positioned at locations throughout the indoor area and signal strength is recorded from different wireless network access points that are available in the indoor area. The wireless network signal strengths are sampled using a mobile computing device at different locations in the indoor area corresponding to the label positions. As users traverse the indoor area with a mobile computing device, individual label identifiers are entered into the mobile computing device and the strength of the wireless network signals is recorded at each label position. The label identifiers may be entered into the mobile computing device by scanning the labels with the device or by manually entering the label identifiers into the device.

The sampled wireless network signal strength and the corresponding label identifiers and positions are correlated to construct a mapping of the indoor area. Specifically, the mapping identifies wireless network signal strength at each of the different label positions in the indoor area. The mapping may then be accessed to identify the locations of other mobile device users that subsequently enter the indoor area based on the wireless network signal strength from different access points detected by that device.

In one aspect, a computer-implemented method includes receiving data associated with at least one label positioned in an indoor area. The data includes an identifier for each label and a reading of wireless network signals received from at least one access point at a location proximate each label. Using a processor, a mapping of each identifier to each wireless network signal reading is generated for each label. The mapping identifies a location in the indoor area where each wireless network signal reading was received. The mapping is stored for subsequent access by client devices.

In another aspect, a computer-implemented method includes receiving data associated with each of a plurality of labels positioned in an indoor area. The data includes an identifier for each label and a reading of wireless network signals received from a plurality of access points at a location proximate each label. Using a processor, a mapping of each identifier to each wireless network signal reading is generated for each label. The mapping identifies a location in the indoor area where each wireless network signal reading was received. Using the processor, a localized version of a map of the indoor area is generated based on the mapping. The localized version of the map is a representation of the indoor area that indicates features of the indoor area on the map that correspond to the received data. The mapping and the localized version of the map is stored for subsequent access by client devices.

In another aspect, a computer-implemented method for generating a localized version of a map of an indoor area. The system includes: means for receiving data associated with each of a plurality of labels positioned in an indoor area, wherein the data comprises an identifier for each label and a reading of wireless network signals received from a plurality of access points at a location proximate each label; means for generating for each label a mapping of each identifier to each wireless network signal reading, wherein the mapping identifies a location in the indoor area where each wireless network signal reading was received; means for generating a localized version of a map of the indoor area based on the mapping, wherein the localized version of the map is a representation of the indoor area that indicates features of the indoor area on the map that correspond to the received data; and means for providing the localized version of the map to a mobile device for display.

DETAILED DESCRIPTION

A mobile computing device may be localized in an indoor area based on the strength of wireless network signals accessible in the indoor area from different access points. A survey of the indoor area is conducted by measuring the strength of the wireless network signals from the different wireless network access points at different locations in the indoor area. A model of wireless network signal strength in the indoor area is constructed based on the survey. Conventionally, the survey may be performed by sampling the wireless network signal strength at carefully recorded positions in the indoor area using a map.

Embodiments of the disclosure simplify the surveying process using labels that are positioned at locations throughout the indoor area and recording the signal strength from different wireless network access points that are available in the indoor area. The wireless network signal strength is sampled using a mobile computing device at different locations in the indoor area corresponding to the label positions. As users traverse the indoor area with mobile computing devices, individual label identifiers are entered into each mobile computing device and the strength of the wireless network signals is recorded at each label position. The label identifiers may be input into the mobile computing device by scanning the labels with the device or by manually entering the label identifiers into the device.

The sampled wireless network signal strength and the corresponding label identifiers and positions are recorded to construct a mapping of the indoor area. Specifically, the mapping identifies wireless network signal strength at each of the different label positions in the indoor area. The mapping may then be accessed to identify the locations of other mobile device users that subsequently enter the indoor area based on the wireless network signal strength from different access points detected by the other mobile devices.

Figure 1:
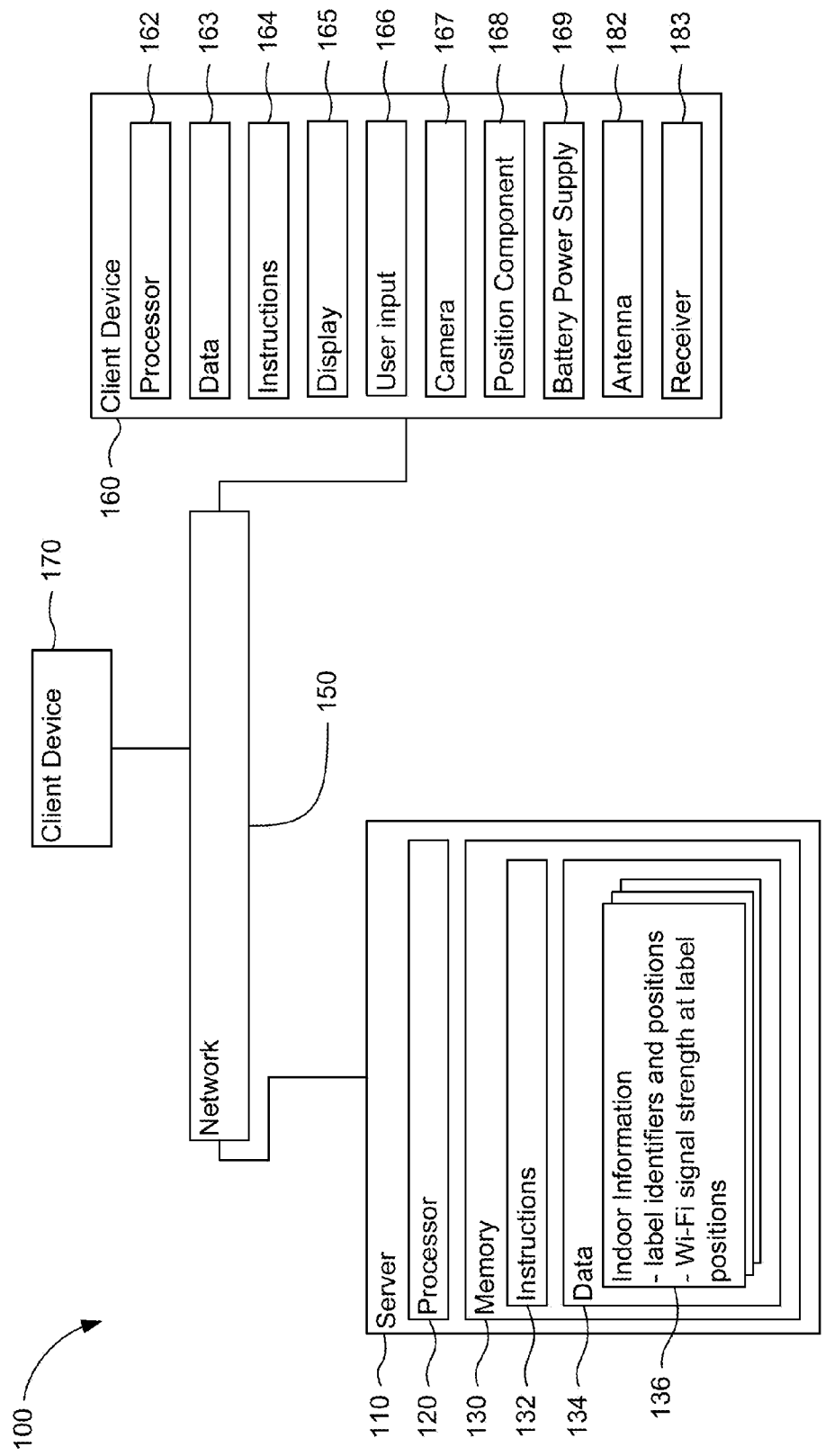
FIG. 1 is a functional diagram of a system in accordance with example embodiments.
Figure 2:
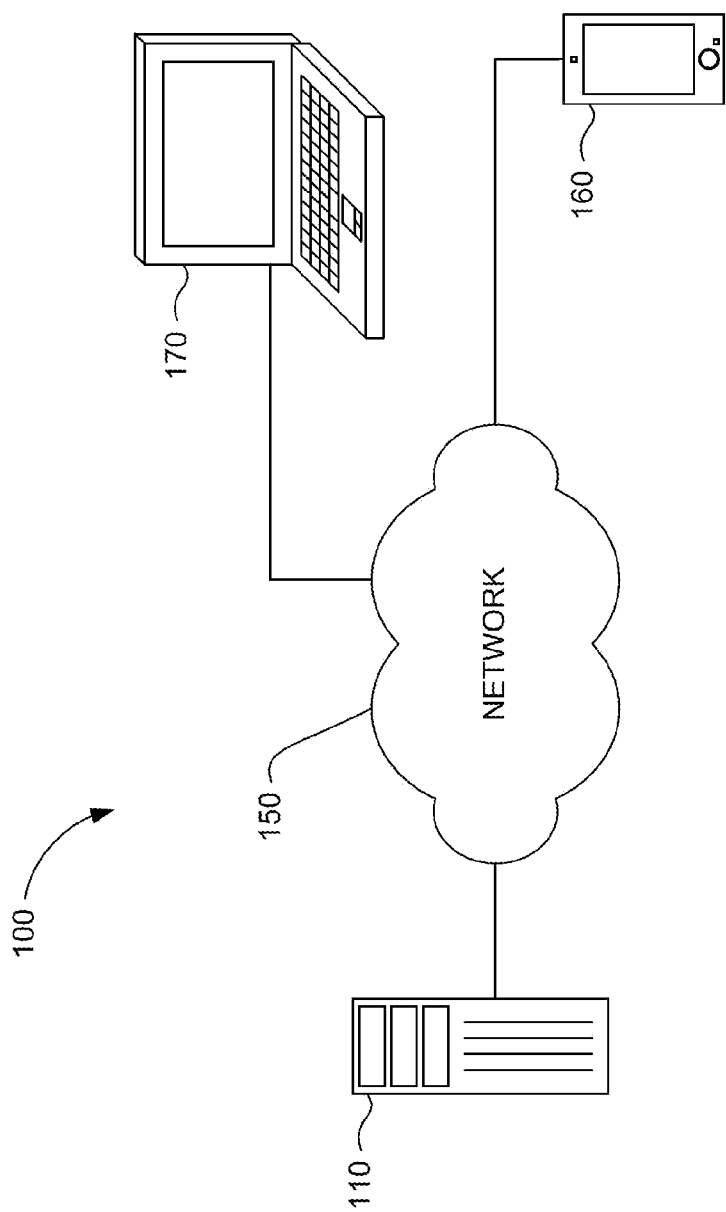
FIG. 2 is a pictorial diagram of the system of FIG. 1.

As shown in FIGS. 1 and 2, a system 100 in accordance with one aspect includes a computer 110 containing a processor 120, memory 130 and other components typically present in general purpose computers. The memory 130 stores information accessible by the processor 120, including instructions 132 and data 134 that may be executed or otherwise used by the processor 120. The memory 130 may be of any type capable of storing information accessible by the processor 120, including a computer-readable medium, or other medium that stores data that may be read with the aid of an electronic device, such as a hard-drive, memory card, flash drive, ROM, RAM, DVD or other optical disks, as well as other write-capable and read-only memories. In that regard, memory 130 may include short term or temporary storage as well as long term or persistent storage. Systems and methods may include different combinations of the foregoing, whereby different portions of the instructions 132 and data 134 are stored on different types of media.

The instructions 132 may be any set of instructions to be executed directly (such as machine code) or indirectly (such as scripts) by the processor 120. For example, the instructions 132 may be stored as computer code on the computer-readable medium. In that regard, the terms "instructions" and "programs" may be used interchangeably herein. The instructions 132 may be stored in object code format for direct processing by the processor 120, or in any other computer language including scripts or collections of independent source code modules that are interpreted on demand or compiled in advance. Functions, methods and routines of the instructions 132 are explained in more detail below.

The data 134 may be retrieved, stored or modified by the processor 120 in accordance with the instructions 132. For instance, although the architecture is not limited by any particular data structure, the data 134 may be stored in computer registers, in a relational database as a table having a plurality of different fields and records, XML documents or flat files. The data 134 may also be formatted in any computer-readable format. By further way of example only, image data may be stored as bitmaps comprised of grids of pixels that are stored in accordance with formats that are compressed or uncompressed, lossless or lossy, and bitmap or vector-based, as well as computer instructions for drawing graphics. The data 134 may comprise any information sufficient to identify the relevant information, such as numbers, descriptive text, proprietary codes, references to data stored in other areas of the same memory or different memories (including other network locations) or information that is used by a function to calculate the relevant data.

The processor 120 may be any conventional processor, such as processors from Intel Corporation or Advanced Micro Devices. Alternatively, the processor 120 may be a graphics processing unit (GPU) or a dedicated controller such as an ASIC. Although FIG. 1 functionally illustrates the processor 120 and memory 130 as being within the same block, it will be understood by those of ordinary skill in the art that the processor 120 and memory 130 may actually comprise multiple processors and memories that may or may not be stored within the same physical housing. For example, memory 130 may be a hard drive or other storage media located in a server farm of a data center. Accordingly, references to a processor, a computer or a memory will be understood to include references to a collection of processors or computers or memories that may or may not operate in parallel.

The computer 110 may be at one node of a network 150 and capable of directly and indirectly receiving data from other nodes of the network 150. For example, computer 110 may comprise a web server that is capable of receiving data from client devices 160, 170 via network 150 such that server 110 uses network 150 to transmit and display information to a user on display 165 of client device 160. Server 110 may also comprise a plurality of computers that exchange information with different nodes of a network for the purpose of receiving, processing and transmitting data to the client devices 160, 170. In this instance, the client devices 160, 170 will typically still be at different nodes of the network than any of the computers comprising server 110.

Network 150, and intervening nodes between server 110 and client devices 160, 170, may comprise various configurations and use various protocols including the Internet, World Wide Web, intranets, virtual private networks, wide area networks, local networks, private networks using communication protocols proprietary to one or more companies, Ethernet, cellular and wireless networks (e.g., wi-fi such as 802.11, 802.11b, g, n, or other such standards), instant messaging, HTTP and SMTP, and various combinations of the foregoing. Such communication may be facilitated by any device capable of transmitting data to and from other computers, such as modems (e.g., dial-up, cable or fiber optic) and wireless interfaces. Although only a few computers are depicted in FIGS. 1 and 2, it should be appreciated that a typical system can include a large number of connected computers.

The client devices 160, 170 may include an antenna 182 and receiver 183 which may be used to scan the wireless network spectrum and identify local wireless network signals. For example, the antenna 182 may receive "beacon" messages and send them to the receiver 183 which demodulates the information to identify wireless network access points. In one example, these beacon messages may be IEEE 802.11 management frames transmitted by access points to announce themselves to potential wireless network users. These frames may contain Service Set Identifiers ("SSID") information as well as physical layer parameters that assist devices in connecting to the wireless network. The beacon messages may also include additional network access information which also assists devices in accessing the network, including whether the access point is accepting new users, whether the data is encrypted, and which type of authentication is being used, for example, no authentication (open to all), password based, web-portable based, or Media Access Control ("MAC") address based. However, it will be understood that data collected in accordance with this disclosure may be limited to the information discussed above, for example MAC addresses, SSIDs or other identifiers and signal strengths, and need not contain additional information. For example, information contained in the network traffic or payload data, such as personal information, need not be collected, and in fact, may actually be removed in order to protect the privacy of the wireless network's users.

Users may be required to take an affirmative step in order to select or "opt-in" to participate. For example, users may be required to sign in to a service before providing any information and may be provided with an explanation of how and why their feedback is being used. Similarly, users may be provided with the opportunity to cease participation temporarily or permanently at any time. By requiring users to opt-in and sign in for the service, this may also reduce the amount of third parties attempting to spam the system. Over time, the system may determine whether the data provided by some users' devices is consistently at odds with that of other users, and disregard the information provided by inconsistent devices.

Each client device 160, 170 may be configured similarly to the server 110, with a processor, memory and instructions as described above. Each client device 160, 170 may be a personal computer intended for use by a person, and have all of the components normally used in connection with a personal computer such as a central processing unit (CPU) 162, memory (e.g., RAM and internal hard drives) storing data 163 and instructions 164, an electronic display 165 (e.g., a monitor having a screen, a touch-screen, a projector, a television, a computer printer or any other electrical device that is operable to display information), and user input 166 (e.g., a mouse, keyboard, touch-screen or microphone). The client device 160 may also include a camera 167, geographical position component 168, accelerometer, speakers, a network interface device, a battery power supply 169 or other power source, and all of the components used for connecting these elements to one another.

The geographical position component 168 may be used to determine the geographic location and orientation of the client device 160. For example, the geographical position component 168 may comprise a GPS receiver to determine the device's latitude, longitude and altitude. Thus, as the client device 160 changes locations, for example by being physically moved, the GPS receiver may determine a new current location. The position component 168 may also comprise software for determining the position of the client device 160 based on other signals received at the client device 160, such as signals received at a cellular phone's antennas from one or more cellular phone towers if the client device 160 is a cellular phone.

Although the client devices 160, 170 may each comprise a full-sized personal computer, they may alternatively comprise mobile devices capable of wirelessly exchanging data, including position information derived from position component 168, with a server over a network such as the Internet. By way of example only, client device 160 may be a wireless-enabled PDA, a cellular phone, a netbook or a tablet PC capable of obtaining information via the Internet or other network. The user may input information using a small keyboard, a keypad, voice recognition or a touch screen.

Data 134 of server 110 may include indoor information 136 that identifies different features of an indoor area to be mapped. The indoor information 136 may include label identifiers corresponding to labels that are positioned throughout the indoor area and a corresponding identification of the position where each label is placed. The indoor information 136 may also include a recording of wireless network signal strength at each label position in the indoor area.

In addition to the operations described below and illustrated in the figures, various operations in accordance with example embodiments will now be described. It should also be understood that the following operations do not have to be performed in the precise order described below. Rather, various steps can be handled in a different order or simultaneously, and may include additional or fewer operations.

Figure 3:
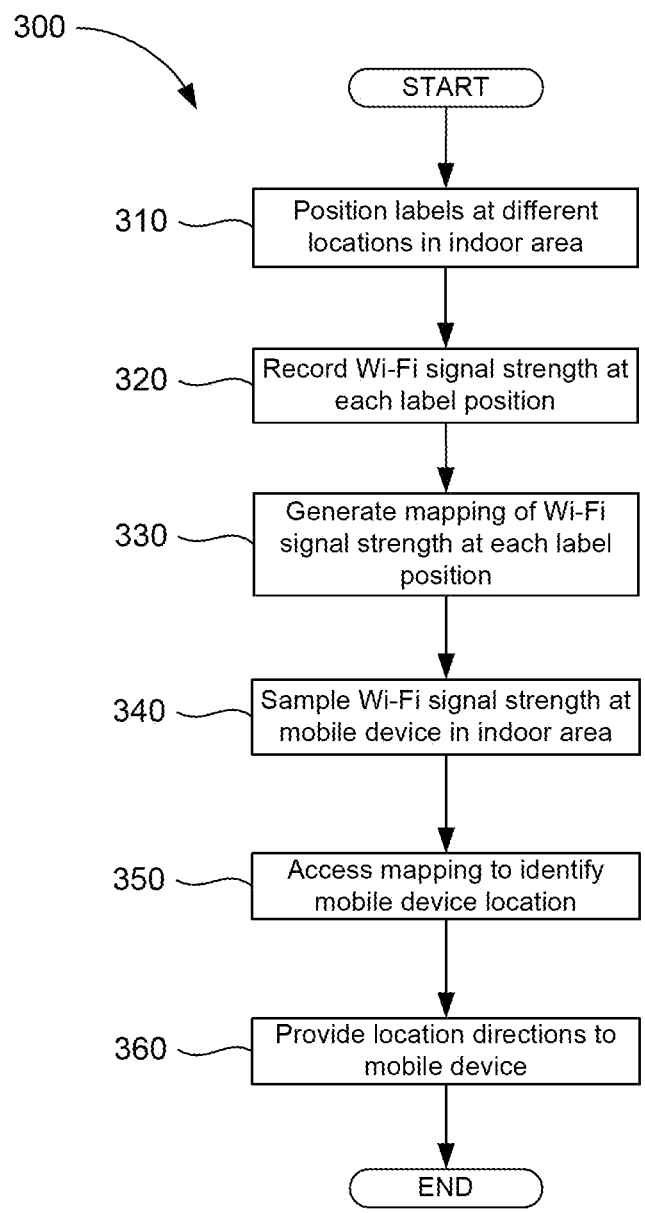
FIG. 3 is a flow diagram in accordance with example embodiments.

FIG. 3 demonstrates a process 300 of localizing a mobile computing device in an indoor area using labels positioned at different locations in the indoor area. The indoor area may be located within any building such as a dwelling, a hotel, an office space, a museum, a retail outlet, a warehouse, an exhibition hall, or a sporting event space. A mobile device may be localized in the indoor area to provide users with information about how to navigate the area and to locate specific objects, fixtures and other points of interest within the area.

In one illustrative example, a visitor to a museum may desire to locate a specific exhibit in the building. The visitor's current location in the museum is identifiable by determining the wireless network signal strength detected by the visitor's mobile computing device and then accessing a mapping of label positions in the building and corresponding wireless network signal strengths. The visitor's location may be determined to be at or near the label position that best corresponds to the detected wireless network signal strength. Once the visitor's current location is determined, directions from the visitor's current position to the specific exhibit may be provided to the visitor's mobile device to guide the visitor to the desired location.

The process 300 begins when labels are positioned at different locations in an indoor area (step 310). Each label includes a unique identifier that may be encoded in a barcode or a quick response (QR) code. The labels may be positioned on specific objects or at specific points of interest in the indoor area, and the location of each label may be recorded using scanner or camera capabilities of the mobile device or by manual data input.

The manual data input may provide additional value to each label. For example, the user may provide a label on a specific object (e.g. water cooler) or point of interest (e.g. restroom) and enter data that identifies the object/point of interest. If the location or existence of the object/point of interest in the indoor area was previously unknown, the user's entry of the identifying data provides additional information about features of the indoor area that may be provided to a user's mobile device.

In one illustrative example, a user may place a barcode on or near a printer in an office environment and then scan the barcode. The user may also use the mobile device to identify that the barcode is specifically associated with the printer (e.g., by entering text). Accordingly, the location of the printer and the location of the user proximate the printer may be identified using the scanned information from the barcode. In some embodiments, the labels need not be physically placed in the indoor space. In one example, the labels may be names for objects existing in the indoor space. The user may input a name for an object into the mobile device when the user is proximate the object.

After a label is positioned in the indoor area, the wireless network signal strength is recorded at the label location (step 320). The wireless network signal strength may be recorded at the same instant that the label identifier is input to the mobile device. Accordingly, each label is associated with a corresponding wireless network signal strength from different access points that are accessible at a location in the indoor area proximate the label. In some embodiments, in addition to the wireless network signal strengths and label identifiers, more data may be collected at the mobile device. Examples of the additional collected data include location and orientation information received at other sensors of the mobile device such as at the mobile device's gyroscope, accelerometer and/or compass.

In some embodiments, the mobile device continuously records the wireless network signal strengths throughout the indoor space. In other words, the mobile device need not survey the wireless network signal strength only at locations proximate a label. By recording the wireless network signal strengths throughout the indoor space, the known locations of the labels may be leveraged to improve estimation of an end user's location in the indoor space.

In some embodiments, multiple mobile computing devices are used to record the wireless network signal strength at each label at different times. Generally, different users that scan the same labels are at the same location in space when the wireless network signal strengths are recorded for that location. This information is useful to address a global optimization problem. A mobile device includes different sensors such as an accelerometer, a gyroscope and a compass, that may provide a noisy estimate of the user's movement relative to an unknown starting position ("dead reckoning"). The labels may be used to identify the device's global position in the indoor space by incorporating the dead reckoning information provided from the sensors and selecting a globally optimal solution in light of both sets of measurements.

A mapping is then generated to identify the wireless network signal strength at each label position (step 330). In some embodiments, after data is collected for each label and the corresponding wireless network signal strength is recorded, optimization techniques are performed such that the mapping provides approximated wireless network signal strengths at locations between known label positions. In some embodiments, the optimization may be based on three assumptions: 1) the positions of objects/points of interest that are associated with the same label are located at essentially the same position; 2) each consecutive step that a user takes while moving around the indoor area and collecting data with the mobile device is approximately 0.5-1 meters in length; and 3) some objects/points of interest are located at known positions (e.g., entrances to buildings). Using these assumptions, optimal positions of the objects/points of interest in the indoor area may be determined. For example, a location halfway between two label positions may correspond to an average, median or mean value of wireless network signal strength of the two label positions. The mapping of label positions and corresponding wireless network signal strengths may be constructed after the optimization is performed. The mapping may be stored at a server for subsequent access by other mobile devices in order to identify the other mobile devices' locations in the indoor area.

After the wireless network signal strength mapping is generated for the different label positions in the indoor area, a subsequent end user may enter the indoor area and sample the wireless network signal strengths using a second mobile device (step 340). The second mobile device detected in the indoor area may be different than the first mobile device used to generate the mapping of label positions to wireless network signal strength (e.g., a different mobile device of a same or different type). The second mobile device detected in the indoor area is identified as a mobile device to be localized such that the end user of the second mobile device may be provided with information about other specific locations in the indoor area. Privacy protections may be provided for user data including, for example, anonymization of personally identifiable information, aggregation of data, filtering of sensitive information, encryption, hashing or filtering of sensitive information to remove personal attributes, time limitations on storage of information, or limitations on data use or sharing. Data may be anonymized and aggregated such that individual user data is not revealed.

The location of the second mobile device in the indoor area is determined by accessing the mapping (step 350). The mapping is accessed using the sampled wireless network data to identify the end user's location in the indoor area. Specifically, the location of the second mobile device is identified to be at or near the label positions that correspond to the sampled wireless network signal strength without requiring that the end user scan labels or provide any other active form of input.

In some embodiments, the wireless network signal strength detected at the mobile device does not directly correspond to a wireless network signal strength value in the mapping. In other words, the detected wireless network signal strength value may lie between two or more wireless network signal strength values in the mapping. In this case, the location of the mobile device can be approximated as a location that lies between the label locations on the mapping that correspond to the closest wireless network signal strength values.

Once the second mobile device is located in the indoor area, the end user may request and be provided with directions to another location in the indoor area (step 360). For example, an end user may enter an unfamiliar building and may need to locate a restroom. The end user may be provided with directions on his mobile computing device from the entrance of the building to the restroom. In this case, the location of the building entrance may be known based on an outdoor mapping of the building (e.g., using GPS), or based on the indoor mapping of the building (e.g., using a label). The restroom location may be identified based on a label that was positioned in the restroom and then scanned by a mobile device when the mapping of wireless network signals to label positions was generated. In one embodiment, the user may follow a navigable route output from the mobile device such as audible instructions, haptic feedback, and/or visual cues displayed on the mobile device.

Figure 4:
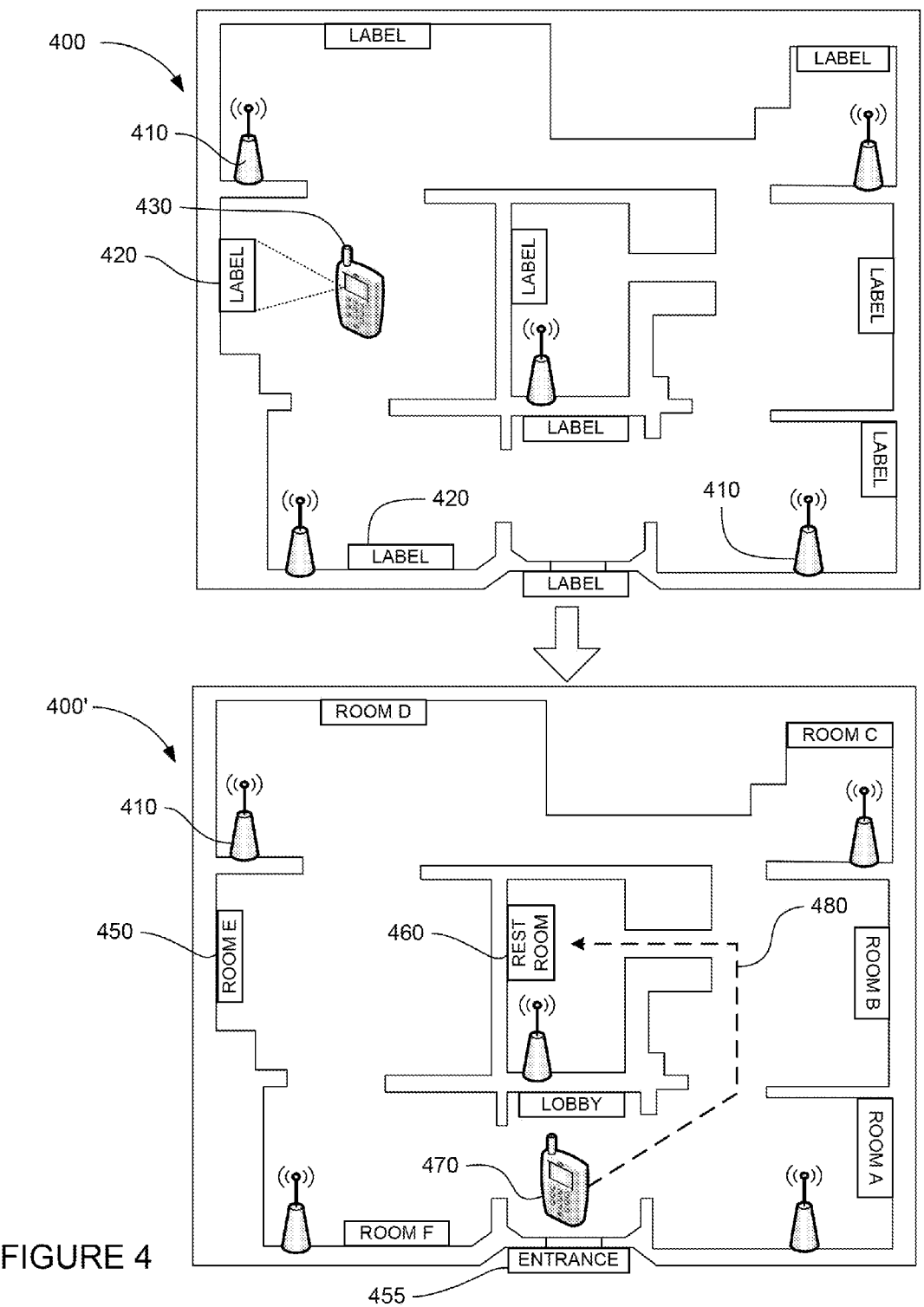
FIG. 4 is an exemplary screen shot in accordance with example embodiments.

FIG. 4 illustrates a map 400 of a floor plan of an indoor area in which a mobile device can be localized. For example, the map 400 may include a depiction of the walls and rooms that are included on one level of a building. Wireless network access points 410 provide wireless network signals to be accessed from the indoor area. The wireless network access points 410 are illustrated as being in the indoor area. However, some of the wireless network access points 410 may be provided outside of the indoor area illustrated in the map 400 and still provide wireless network signals that are strong enough to be accessed by a mobile device from the indoor area.

Referring to the upper portion of FIG. 4, the user provides a number of different labels 420 throughout the indoor area. The user may position a label 420 (e.g., a barcode label or a QR label) on different objects, fixtures, features or points of interest of the indoor area for specific identification. For example, the user may place a label 420 at an area or on an object (e.g., a door) that corresponds to a point of interest (e.g., an entrance to the indoor area, a specific room in the indoor area).

The user may use a mobile device 430 to correlate the label 420 to the object/point of interest. Specifically, after the label 420 is positioned at or near the object/point of interest, the user may scan (or otherwise provide as sensory input) the label 420 using the mobile device 430. In this regard, the object/point of interest may be associated with the location at which the label 420 is scanned using the strength of the wireless network signals recorded by the mobile device 430. The strength of the wireless network signals sensed by the mobile device 430 when the label 420 is scanned provides calibration for the mobile device 430 and the wireless network signals at the location of the label 420. In other words, at the moment when the label 420 is scanned by the mobile device 430, the wireless network signal strength at the mobile device 430 is also recorded such that the location of the label 420 is correlated with the recorded wireless network signal strength.

In some embodiments, after the user scans the label 420, the user may enter text that identifies the object/point of interest with which the label 420 is associated. This user input provides additional identifying information that may be passed on to subsequent users that request a localized map of the indoor area. Accordingly, the additional identifying information is beneficial for providing users with an enhanced description of the indoor area. The user may continue scanning the different labels 430 and recording the corresponding wireless network signal strengths using the mobile device 430 until all of the labels 420 in the indoor area have been scanned.

In some embodiments, multiple mobile computing devices are used to record the wireless network signal strength at each label at different times. This feature allows for the correction of varying wireless network signal strengths over time to provide an accurate accounting of the different signals generated from the wireless network access points 410.

The correlation between the scanned labels 420 and the recorded wireless network signal strengths at the moment when the labels 420 were scanned is retrieved from the mobile device 430 and processed to generate a mapping of wireless network signal strengths at different locations in the indoor area. As illustrated in the lower portion of FIG. 4, the mapping of wireless network signal strengths to the label positions may be used to generate a localized map 400' including visual representations of the different objects/points of interest in the indoor area. Specifically, the localized map 400' includes visual indicators identifying locations of the objects/points of interest corresponding to the labels 420. Each visual indicator may be displayed with any information associated with the label (e.g., a name or image of the object/point of interest with which the label is associated). Accordingly, the localized map 400' may assist an end user in navigating the indoor area and locating the specific objects/points of interest. For example, the localized map 400' may include a visual or other indicator 450 that indicates the location of a specific room (e.g., Room E) in the indoor area, a visual or other indicator 455 that indicates the location of an entrance to the indoor area, and a visual or other indicator 460 that indicates the location of a restroom in the indoor area. The location of the visual indicators 450, 455, 460 on the localized map 400' may be determined based on the mapping between the positions of the labels 420 scanned by the mobile device 430 and the corresponding wireless network signal strengths at the label positions.

Once the locations of the objects/points of interest in the indoor area are determined based on the mapping of the labels 420 and the corresponding wireless network signal strengths, the localized map 400' may be provided to an end user's mobile device 470 upon request. The end user may request the localized map 400' from her mobile device 470 to navigate the indoor area to locate a specific object/point of interest. The localized map 400' also enables the end user to locate and identify specific objects, fixtures and points of interest corresponding to the labels 420 that may be identified on the map. The mobile device 470 may also be used to identify the end user's current location in the indoor area based on the strength of the wireless network signals received at her mobile device 470 and display the identified current location on the localized map 400'.

In one illustrative example, the end user of mobile device 470 enters the indoor area at the entrance 455 and accesses the localized map 400'. The user may then request directions from his current location to the restroom 460. In response, the user is provided with directions 480 from the entrance 455 to the restroom 460.

In some cases, the user's location may be improperly identified in the indoor area. The labels 420 may be used to calibrate the user's current location in the event that the mobile device misidentifies the user's location. Specifically, the user may scan any label 420 that was previously collected as sensory data such that a location of the label 420 is known. In this case, when a user scans the label 420, the user's location may be corrected to be at the same location as the object/point of interest associated with the label 420.

In one embodiment, the labels 420 may be provided on a variety of different objects/points of interest in the indoor area to be used as a basis for determining whether a user accessed each label 420. For example, a school teacher may desire to have her students observe specific exhibits in a museum. Labels positioned on or near each exhibit may be used to determine which students accessed which exhibits. A similar configuration may be used to provide a game similar to a scavenger hunt where a determination may be easily made to identify which players accessed specific locations by scanning the labels at the locations with their mobile devices.

As described above, aspects of the disclosure relate generally to indoor localization of a mobile device. Labels are positioned at known locations throughout an indoor area and signal strength is recorded from different wireless network access points that are accessible in the indoor area. The wireless network signal strength is sampled using a mobile device at different locations in the indoor area corresponding to the label positions. As a user traverses the indoor area with the mobile device, individual label identifiers are entered into the mobile device and the strength of the wireless network signals is recorded at each label position. The label identifiers may be entered into the mobile device by scanning the labels with the device or by manually entering the label identifiers into the device. The sampled wireless network signal strength and the corresponding label identifiers and positions are recorded to construct a mapping of the indoor area. Specifically, the mapping identifies wireless network signal strength at each of the different label positions in the indoor area. The mapping may then be accessed to identify the locations of other mobile device users that subsequently enter the indoor area based on the wireless network signal strength from different access points detected by the other mobile devices.

As these and other variations and combinations of the features discussed above can be utilized without departing from the scope of the claims, the foregoing description of exemplary embodiments should be taken by way of illustration rather than by way of limitation. It will also be understood that the provision of examples (as well as clauses phrased as "such as," "e.g.", "including" and the like) should not be interpreted as limiting; rather, the examples are intended to illustrate only some of many possible aspects.

The invention claimed is:

1. A computer-implemented method comprising:
   receiving data associated with at least one label positioned in an indoor area, wherein the data comprises an identifier for each label and a reading of wireless network signals received from at least one access point at a location proximate each label;
   generating for each label, using a processor, a mapping of each identifier to each wireless network signal reading, wherein the mapping identifies a location in the indoor area where each wireless network signal reading was received;
   generating a localized version of a map of the indoor area based on the mapping, wherein the localized version of the map includes a visual representation of the indoor area that indicates features of the indoor area on the map that correspond to the received data; and
   storing the mapping for subsequent access by client devices.

2. The method of claim 1, further comprising:
   storing the localized version of the map for subsequent access by the client devices.

3. The method of claim 2, wherein the localized version of the map includes at least one visual indicator that identifies a location in the indoor area where each wireless network signal reading was received.

4. The method of claim 3, further comprising providing the localized version of the map to a mobile device for display.

5. The method of claim 4, further comprising:
- identifying a location of the mobile device in the indoor area based on the mapping; and
- indicating the identified location on the localized version of the map.

6. The method of claim 5, wherein directions from the location of the mobile device to a location within the indoor area are provided on the localized version of the map at the second device.

7. The method of claim 1, wherein the identifier is encoded as a barcode on each label.

8. The method of claim 1, wherein the identifier is encoded as a quick response code on each label.

9. The method of claim 1, further comprising:
- receiving additional data associated with the at least one label, wherein the additional data comprises information that identifies the location proximate each label.

10. The method of claim 9, wherein the additional data is received at a mobile computing device as manually entered data.

11. The method of claim 1, further comprising:
- approximating wireless network signal readings at locations in the indoor area that are not proximate to any of the labels.

12. A computer-implemented method comprising:
- receiving data associated with each of a plurality of labels positioned in an indoor area, wherein the data comprises an identifier for each label and a reading of wireless network signals received from a plurality of access points at a location proximate each label;
- generating for each label, using a processor, a mapping of each identifier to each wireless network signal reading, wherein the mapping identifies a location in the indoor area where each wireless network signal reading was received;
- generating, using the processor, a localized version of a map of the indoor area based on the mapping, wherein the localized version of the map includes a visual representation of the indoor area that indicates features of the indoor area on the map that correspond to the received data; and
- storing the mapping and the localized version of the map for subsequent access by client devices.

13. The method of claim 12, wherein the localized version of the map includes a plurality of visual indicators each identifying a location in the indoor area where each wireless network signal reading was received.

14. The method of claim 13, further comprising providing the localized version of the map to a mobile device for display.

15. The method of claim 14, further comprising:
- identifying a location of the mobile device in the indoor area based on the mapping; and
- indicating the identified location on the localized map.

16. The method of claim 15, wherein directions from the location of the mobile device to a location within the indoor area are provided on the localized version of the map at the mobile device.

17. The method of claim 12, further comprising:
- receiving additional data associated with the at least one label, wherein the additional data comprises information that identifies the location proximate each label.

18. The method of claim 12, further comprising:
- approximating wireless network signal readings at locations in the indoor area that are not proximate to any of the labels.

19. A system for generating a localized version of a map of an indoor area, the system comprising:
- means for receiving data associated with each of a plurality of labels positioned in an indoor area, wherein the data comprises an identifier for each label and a reading of wireless network signals received from a plurality of access points at a location proximate each label;
- means for generating for each label a mapping of each identifier to each wireless network signal reading, wherein the mapping identifies a location in the indoor area where each wireless network signal reading was received;
- means for generating a localized version of a map of the indoor area based on the mapping, wherein the localized version of the map includes a visual representation of the indoor area that indicates features of the indoor area on the map that correspond to the received data; and
- means for providing the localized version of the map to a mobile device for display.

20. The system of claim 19, wherein the localized version of the map includes a plurality of visual indicators each identifying a location in the indoor area where each wireless network signal reading was received.

21. The system of claim 19, further comprising:
- means for identifying a location of the mobile device in the indoor area based on the mapping; and
- means for indicating the identified location on the localized map.

22. The system of claim 19, wherein directions from the location of the mobile device to a location within the indoor area are provided on the localized version of the map at the mobile device.

* * * * *